United States Patent [19]

Chaplin

[11] Patent Number: 5,315,655
[45] Date of Patent: May 24, 1994

[54] METHOD AND APPARATUS FOR ENCODING DATA OBJECTS ON A COMPUTER SYSTEM

[75] Inventor: Michael Chaplin, Berkeley, Calif.

[73] Assignee: Notable Technologies, Inc., Oakland, Calif.

[21] Appl. No.: 991,366

[22] Filed: Dec. 16, 1992

[51] Int. Cl.$^5$ .............................................. H04L 9/00
[52] U.S. Cl. .......................................... 380/4; 380/25
[58] Field of Search ..................... 380/3, 4, 23, 24, 25; 382/56; 395/600, 934; 341/67

[56] References Cited

U.S. PATENT DOCUMENTS

| | | | |
|---|---|---|---|
| 4,955,066 | 9/1990 | Notenboom | 382/56 |
| 5,058,162 | 10/1991 | Santon et al. | 380/25 |
| 5,060,263 | 10/1991 | Bosen et al. | 380/25 |
| 5,144,659 | 9/1992 | Jones | 380/4 |

FOREIGN PATENT DOCUMENTS 0214887  8/1990  Japan ..................................... 380/4

OTHER PUBLICATIONS

"Computer Program Autodoubler", Fifth Generation Inc., Copyright 1991; Fifth Generation Systems, 10049 N. Reiger Rd., Baton Rouge La. 79809.
"Computer Program Stuffit 1.5.1 Mac Archive Utility", Raymond Lau; Copyright 1988; For Copies Write Mr. Lau at 100-0470 Ave. Forrest Hills, N.Y. 11375.

*Primary Examiner*—Tod R. Swann
*Attorney, Agent, or Firm*—Blakely, Sokoloff, Taylor & Zafman

[57] ABSTRACT

A method and apparatus for real-time encoding and decoding of data on a computer system. The present invention is used preferably with a utility which causes data objects to be encoded and decoded. Such utilities include data compression utilities, data encryption utilities and security utilities. The general method involves the steps of opening an encoded data object; starting operation of an encoding/decoding means; encoding a decoded data object from a list of decoded data objects; removing the decoded data object from the list of decoded data objects; decoding the encoded data object; posting the encoded data object to the list of decoded data objects; terminating execution of the encoding/decoding utility; and invoking an application associated with said data object that was just decoded. Data objects may be comprised of sub-objects of a plurality of sub-objects. In such instances, the encoding and decoding occurs at the sub-object level.

11 Claims, 11 Drawing Sheets

METHOD AND APPARATUS FOR ENCODING DATA OBJECTS ON A COMPUTER SYSTEM

BACKGROUND OF THE INVENTION

1. Field Of the Invention

This invention relates to the field of computer operating environments, in particular the operation of operating system utilities for encoding and decoding data objects.

2. Prior Art

A computer requires an operating system in order to be functional. An operating system provides the logic, timing and protocols by which the various components of a computer system communicate. However, an operating system may not include all of the tools that a user may want to have in order to maintain their operating environment. Commonly, a user may utilize operating system utilities in order to provide desired functionality.

Operating system utilities generally operate in one of two modes; a mode requiring user intervention and a mode that is transparent to the user. Examples of utilities requiring user intervention are a storage media back-up program or data recovery utilities. Transparent utilities are performed without user intervention. They are automatically invoked in response to some event occurring, e.g. the starting of an application. Examples of transparent utilities include processor accelerators or memory managers.

Of course some utilities may operate in both modes. For example data compression utilities may be invoked by a user to compress a file; or may operate transparently where files are decompressed and compressed automatically when they are opened and closed.

Transparent utilities must have a means by which they recognize that they should be invoked. Using data compression as an example, whenever a user closes a file, i.e. indicates to the computer system that the file is no longer needed, that file is compressed in order to save storage on a storage medium such as a hard disk. The data compression utility will be invoked to initially compress and store the file. Next, when the file is to be re-used, the data compression utility will be invoked to decompress the file. Finally, when use of the file is complete, the data compression utility is invoked to re-compress the file (i.e., to compress the file again). Note that when the file is closed, the file may initially be stored as uncompressed and then recompressed. Several solutions will be discussed with respect to the data compression example.

It is first instructive to discuss the notion of foreground and background processing. Computer systems that support foreground and background processing are typically referred to as having multi-tasking capabilities. A task operating in the foreground is one in which the user is typically aware of. For example, a spreadsheet program being run by the user is in the foreground. Conversely, a task running in the background is one that is executing, while the user is performing some other task on the computer system (i.e. it is transparent to the user). An example of a background task is a print job.

A first solution to the problems of invoking the compression utility is to keep the compression utility always running in the background. Whenever a file is decompressed the compression utility is notified and the name of the file is added to the compression utility's list of open files. The compression utility periodically scans the list of decompressed files. When it detects that a decompressed file has been closed, it compresses the file.

There are several disadvantages to this approach. First the compression utility must always be running in the background. This degrades the overall performance of the computer system, and requires allocation of dedicated memory. Second, because the compression program is running in the background, background recompression of the file may interfere with the any foreground operation on the file. Finally, if the user is frequently switching back and forth between a compressed file and other files, the user may experience annoying time delays because of the repeated decompressions and recompressions of the file. These problems can cause unexpected delays and even corruption of the compressed file.

A second solution is to associate a file with the compression utility. In this manner, whenever the file is referenced, e.g. opened, the compression utility will be invoked. However, when the file is closed, there must be a means to notify the utility that a re-compression is required. Some known computer operating systems provide a means to do this, e.g. the MS/DOS ® Operating System, available from the Microsoft Corporation of Redmond, Wash. Other known computer operating systems do not provide ready means, e.g. the PENPOINT ™ Operating System, available from the Go Corporation of Foster City, Calif. MS/DOS and Microsoft are registered trademarks of Microsoft Corporation. PENPOINT is a trademark of Go Corporation.

A third way of integrating a compression utility into the operating system environment is to grant ownership of a resource to the compression utility. For example, a hard disk resource may be "owned" by the compression utility. Whenever that hard disk resource is accessed, the utility is automatically invoked. Unfortunately, this will typically require a high degree of integration of the utility into the operating system. Such integration may be difficult, if not impossible, for many operating system environments.

While various solutions exist, each has its drawbacks. Thus, it is a primary object of the present invention to provide a means by which a transparent utility may be integrated into an operating system environment that overcomes the foregoing drawbacks of the prior art.

It is also known that the utilities require their own temporary operating storage areas in order to perform their function. For example with respect to a data compression utility, temporary storage is required for the uncompressed data as well as the compressed data. If the temporary storage area is not available, the function of the utility cannot be performed. Moreover, if sometime during the execution of the utility, the required temporary storage is not available, the compression must be restarted. As various applications may be contending for the same pool of temporary storage, it is difficult to accurately estimate the storage that would be needed.

Thus, it is desirable to minimize the amount of temporary storage required to execute a utility.

SUMMARY

A method and apparatus for integrating a real-time utility into an operating system environment is disclosed. The present invention is used preferably with utilities which cause data objects to be encoded and decoded. A data object may be a file, a directory of files or a combination of both. Such encoding/decoding utilities include data compression, data encryption and security utilities. The general method of the protocol involves the following steps: opening a first encoded data object; starting operation of a encoding/decoding means; encoding a decoded data object from the list of decoded data objects; removing the decoded data object from the list of decoded data objects; decoding the first encoded data object; posting the first data object to the list of data objects; and terminating an execution of the encoding/decoding utility.

In some operating system environments the data objects may be comprised of one or more sub-objects. When used in such an operating system environment, the present invention causes the utility to be performed at the sub-object level. This has advantages of minimizing the temporary storage required for execution of the utility.

DETAILED DESCRIPTION OF THE PRESENT INVENTION

A method and apparatus for causing data objects to be encoded and decoded on a computer system is disclosed. In the following description, numerous specific details, e.g. file system and document architectures are set forth in order to provide a thorough understanding of the present invention. It will be apparent, however, to one skilled in the art that the present invention may be practiced without such specific details. In other instances, specific implementation details, such as the data encoding and decoding algorithms used, have not been shown in detail in order not to unnecessarily obscure the present invention.

Overview Of A Computer System In The Preferred Embodiment

Figure 1:
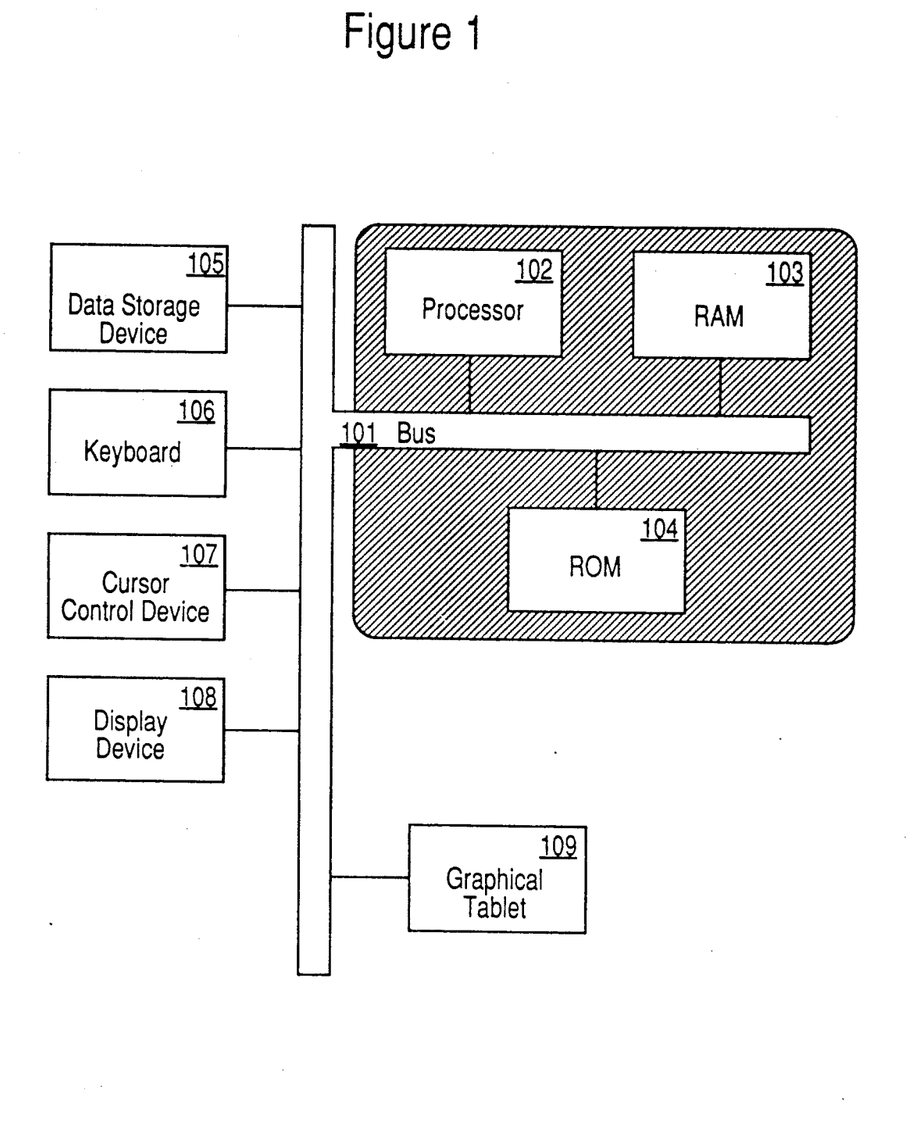
FIG. 1 illustrates a computer system as may be utilized in the currently preferred embodiment of the present invention.

The preferred embodiment of the present invention may be practiced on computer systems having alternative configurations. FIG. 1 illustrates some of the basic components of such a computer system, but is not meant to exclude other components or to imply that such components are discrete. It is known that some components, most notably a display device, may perform both input and output functions (as found in pen based systems). In any event, the computer system illustrated in FIG. 1 comprises a bus or other communication means 101 for communicating information, a processing means 102 coupled with the bus 101 for processing information, a random access memory (RAM) or other storage device 103 (commonly referred to as a main memory) coupled with the bus 101 for storing information and instructions for the processor 102, a read only memory (ROM) or other static storage device 104 coupled with the bus 101 for storing static information and instructions for the processor 102.

Other devices coupled to the bus 101 include a data storage device 105, such as a magnetic disk and disk drive for storing information and instructions, an alphanumeric input device 106 including alphanumeric and other keys for communicating information and command selections to the processor 102, a cursor control device 107, such as a mouse, track-ball, cursor control keys, etc., for controlling a cursor and communicating information and command selections to the processor 102, a display device 108 for displaying data input and output and a graphical tablet 109 for communicating information to the processor 102 by inscription.

The processor 102 is used to perform various functions of the method. For example, the actual encoding and decoding of data objects may be performed on processor 102. However, it is recognized that such encoding and decoding may be performed by specially designed and dedicated encoding and decoding processors. Further, references to storage may be embodied in either RAM 103 or data storage device 105. For example, temporary storage may be implemented RAM 103 or data storage device 105.

The current embodiment of the present invention operates in computer systems utilizing the PENPOINT ™ Operating System (PENPOINT is a trademark of GO Corporation of Foster City, Calif.). As do many known operating systems, the PENPOINT operating system utilizes a hierarchical file system for organizing data. PENPOINT extends the use of hierarchies to documents. As will become apparent in the description of the present invention, this hierarchy can be exploited not only for document organization, but for document processing.

Figure 2:
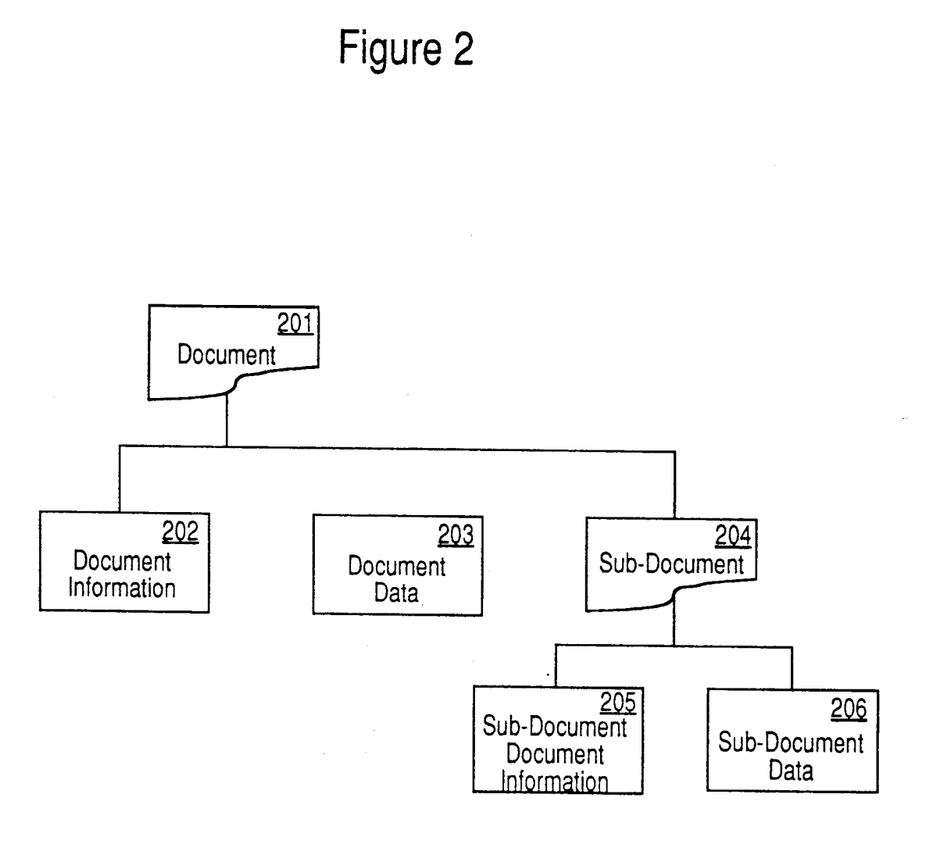
FIG. 2 illustrates the structure of a document as defined by an operating system of the currently preferred embodiment of the present invention.

FIG. 2 illustrates the hierarchical document architecture as utilized in the PENPOINT operating system. Referring to FIG. 2 a document 201 has associated with it document information block 202, data 203, and a sub-document 204. The document name 201 will include the actual name of the document, as well as the name of the application with which the document is associated. This is referred to as the document type. For example, if the document is a word processing document, the name of the word processor program with which the document was created would be included as the document type. The document information block 202 contains information concerning the underlying application for the document. For example, information needed to invoke the underlying application may be included. The data block 203 contains data (e.g. text or graphic data) for the document.

The document architecture further allows a document to utilize functionality of other applications. This is accomplished by imbedding other applications within the document. This is illustrated here as sub-document 204. Associated with the sub-document 204 is a sub-document information block 205 which is analogous to the document information block 202. Further associated with sub-document 204 is a sub-document data block 206.

The document architecture described above is similar to hierarchical file systems. Hierarchical file systems are used to organize documents in a logical fashion. Hierarchical files systems are well known in the art and have been utilized on numerous computer systems, e.g. the UNIX ® (a registered trademark of AT&T) operating system. A directory in a hierarchical file system is comprised of items. These items include data files, executable code files, and other directories (e.g. sub-directories) that are directly accessible. As will become apparent to those skilled in the art, extension of various aspects of the present invention could be readily made to operate on file systems rather than merely with respect to documents.

In the following description, the term data object is used. A data object may refer to either a document or a directory, as described with respect to the hierarchical structures above. The term sub-object is also used and denotes either a file or a sub-directory, data files (or blocks) or sub-documents.

Overview of the Encoding/Decoding Method

The present invention is directed towards means for causing data to be encoded and decoded. Encoding may be done for various reasons, e.g. data compression or data encryption. Decoding is necessary before the data may be used. However, as noted above, the currently preferred embodiment of the present invention is designed for operation on a data compression system. The method of compression utilized in the currently preferred embodiment is a derivative of the well known Lempel-Ziv data compression algorithms. However, other data compression algorithms could be utilized without departure from the spirit and scope of the present invention.

Figure 3A:
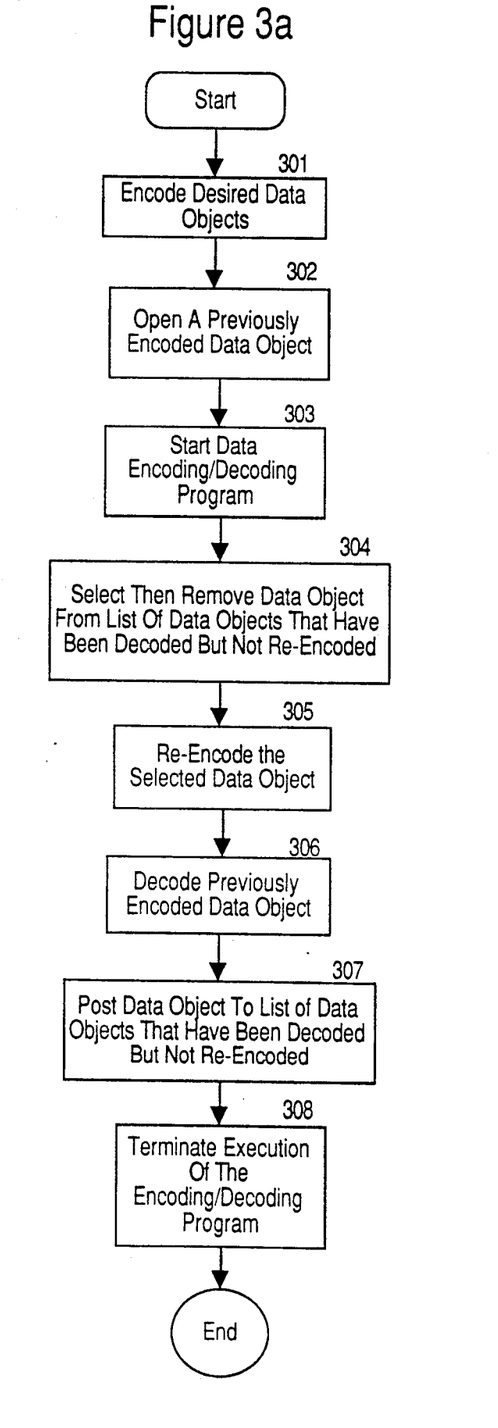
FIG. 3a is a flow chart illustrating the steps of the method of the currently preferred embodiment of the present invention.

FIG. 3a is a flow chart generally describing the steps for causing the encoding and decoding of data objects in the currently preferred embodiment of the present invention. The method insures that a data object gets re-encoded after it has be decoded. Referring to FIG. 3a, the desired data objects are encoded, step 301. This involves identifying the data objects that are to be encoded, and will continue to be encoded and decoded so long as they exist. For example, data objects that will be compressed and decompressed in the computer system of the currently preferred embodiment, will be initially compressed by selecting and evoking the compression program. Thereafter, every time the data object is opened it will be decompressed, and every time the document is closed it will be compressed.

Next, a previously encoded data object is opened, step 302. When this is done the data encoding/decoding program will be started, step 303. For example, a compression/decompression program will be started. The data encoding/decoding program maintains a list of objects that have been decoded but no re-encoded. A next step is to select then remove data objects from the list of data objects that have been decoded but not re-encoded, step 304. The selected data object is then re-encoded, step 305. In this process a check will be made to determine whether or not that data object is still in use. If the data object is still in use then it cannot be re-encoded until it is closed. It should be noted that when a data object is closed it is not encoded. Sometime during the ordinary course of operation, the data object will become encoded. In any event, presuming that the data object is not open the selected data object will be re-encoded.

The data encoding/decoding program will then decode the opened object, step 306. In the currently preferred embodiment this means that the opened object will be decompressed. The data object that has just been decoded is then posted onto the list of data objects to be re-encoded, step 307. Finally, the execution of the encoding/decoding program is terminated, step 308.

At this point, an application associated with the decoded data object may be invoked. Thus, operation of the encoding and decoding of the objects would be transparent to the user.

In the data compression of the currently preferred embodiment, recompression of the last decompressed document is delayed until a compressed document is decompressed. This has advantages over prior known methods of invoking encoding/decoding programs because it no longer requires the application to always be running. It should be noted that all times there will be one document that has not been re-compressed.

This method has certain other advantages. First, it allows the user to select the data objects that will be subject to encoding and decoding. This will avoid unnecessary processing for the encoding and decoding. Second, if documents are to be shared, it may not be desirable to have the documents encoded (particularly if the user with whom the document is to be shared does not utilize the utility). With the advent of networking and "shared disks" this could be particularly important. Third, contention for data objects may be reduced. As data objects may be continually opened and closed, a data object may be repeatedly encoded and decoded. Thus, there may be contention between an encoding utility and user wishing to use the data object.

A fourth advantage arises in situations where two data objects are being used alternatively, one which is subject to encoding and the other is not. In many operating systems environments, such as the preferred PENPOINT operating system environment, a data object, or more precisely the underlying application, must be closed before another application is opened. So if the data object subject to encoding is large, e.g. a spread sheet, and the data object not encoded is small, e.g. a calculator program, extra processor and disk activity resulting from the coding and decoding of the large files as the user switches between the two data objects, is avoided.

The encoding/decoding means of the currently preferred embodiment will have various operating states.

Figure 3B:
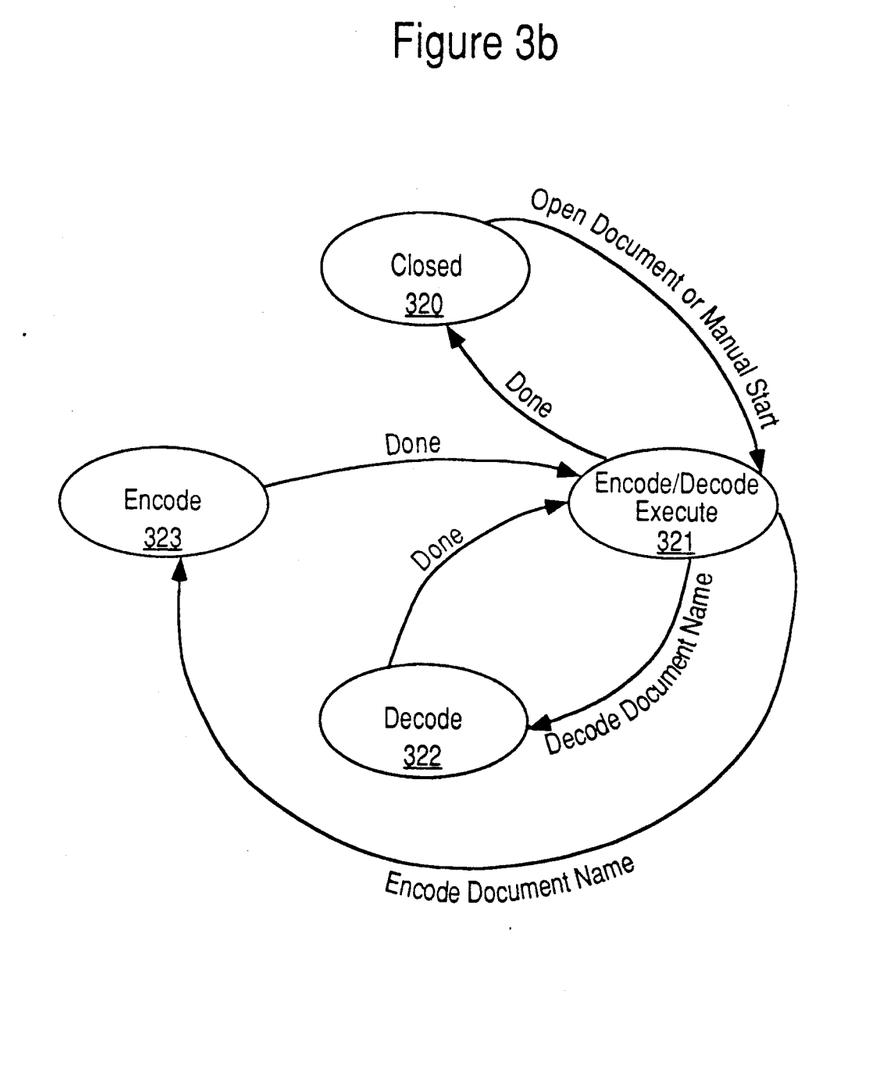
FIG. 3b is a state diagram for a data encoding/decoding program in the currently preferred embodiment of the present invention.

These operating states are described with reference to FIG. 3b. FIG. 3b is a state diagram for a encoding/decoding program in the currently preferred embodiment of the present invention. The program begins in a closed state 320. The closed state 320 is one where the encoding/decoding program is not operating. When a document is opened or there is a manual start of the application, the encode/decode execute state 321 is entered. It is from this encode/decode execute state 321 that the various functions described with reference to FIG. 3a, are invoked. When a decode is required, a document name is provided and decode state 322 is entered. Upon completion of decoding the document, the encode/decode execute state 321 is reentered. If an encode document name is provided the encode state 323 is entered. When the encoding is completed, the encode/decode execute state 321 is entered. If there is no document to be encoded or decoded, the application also terminates and enters the closed state 320.

The method described the flowchart of FIG. 3a and state diagram of FIG. 3b describes in general terms causing the encoding and decoding of documents. Various details on the implementation of the method are described below.

Preparing a Data Object Structure for Encoding/Decoding

Figure 4:
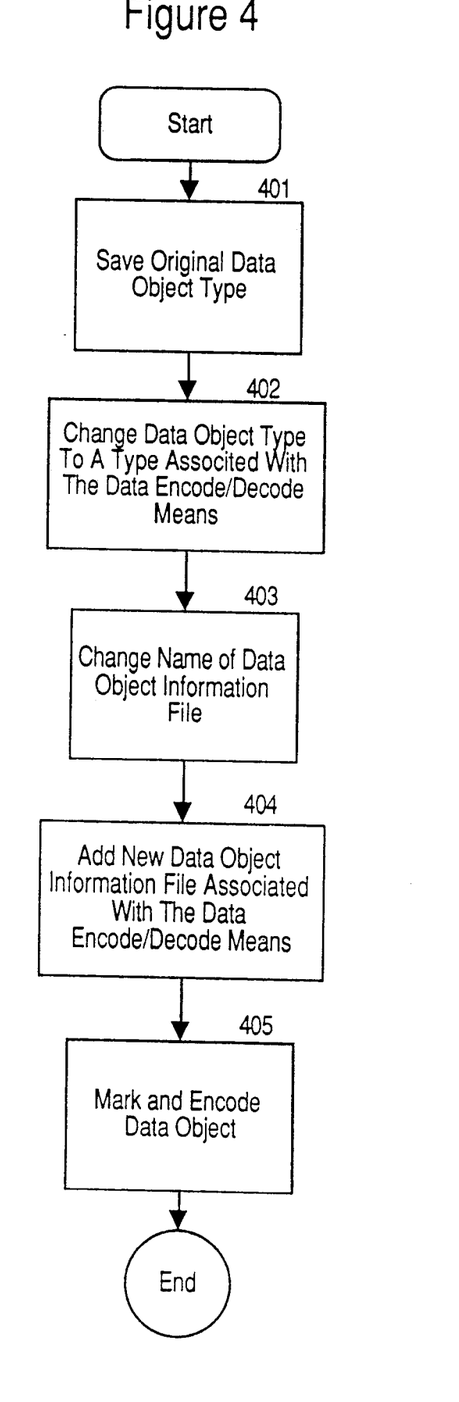
FIG. 4 is a flow chart which illustrates the steps taken in preparing a data object for encoding as performed in the currently preferred embodiment of the present invention.
Figure 5A:
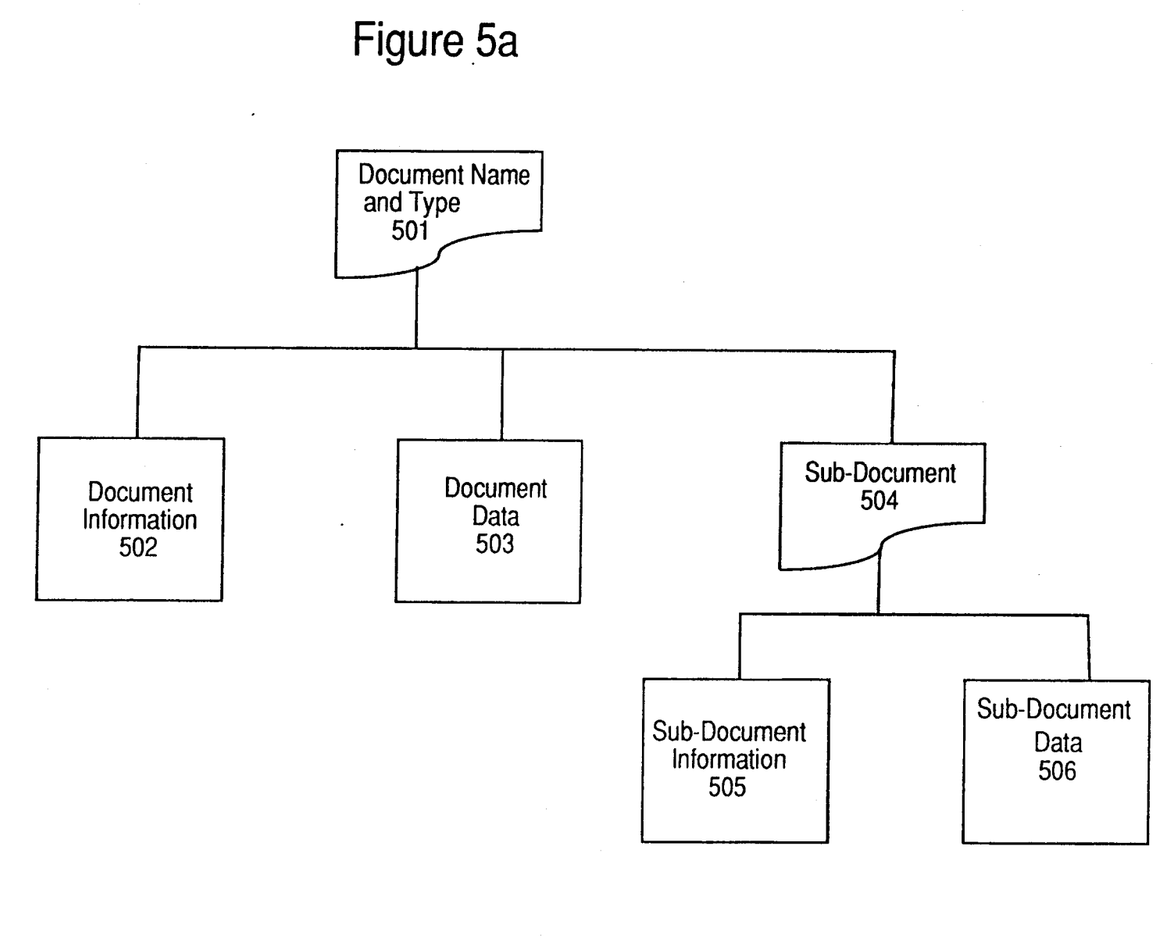
FIG. 5a illustrates a document prior to compression as found in the operating system environment of the currently preferred embodiment of the present invention.

Certain preparation steps are performed so that the data object may be associated with the encoding/decoding means yet retaining association be associated with the encoding/decoding means yet retaining association with the underlying application program. An operating system will typically expect and require information to be provided regarding the data object. For example, this information may identify an application that must be started in order to utilize the document. FIG. 4 is a flow chart illustrating the steps taken for preparing a data object for encoding. Generally, what will be done is to transform the original data object type to one that is associated with the data encode/decode means. This allows the data encode/decode means to be invoked upon opening of the data object. In the currently preferred embodiment, the data object's file type provides the information as to the means, i.e. software application program, which should be invoked in order to use the data object. In any event, the original data object type is saved, step 401. Next the data object type is changed to a type associated with the data encode/decode means, step 402. For example, if the encode/decode means is a program named PENCRUSH, the data object type will have a name associated with PENCRUSH. Next, the data object information file name is changed, step 403. Recall that the data object information file contains the necessary information for executing the application associated with the data object. A new data object information file that is associated with the data encode/decode means is then added to the document, step 404. Finally, the data object is marked encoded and encoded, step 405. The step 405, as performed in the currently embodiment will be described in greater detail with respect to FIG. 7. illustrated with respect to FIG. 5a and 5b. FIG. 5a illustrates a document prior to encoding. Note the document has a file name 501 and several sub-objects. The first object is the document information file 502. As described above, the document information file 502 contains information concerning the underlying application for the data object. Document data 503 is information utilized by the underlying application. Sub-document 504 is used for imbedded documents within the parent document. The sub-document 504 is comprised of its own sub-document information 505 and sub-document data file 506.

Figure 5B:
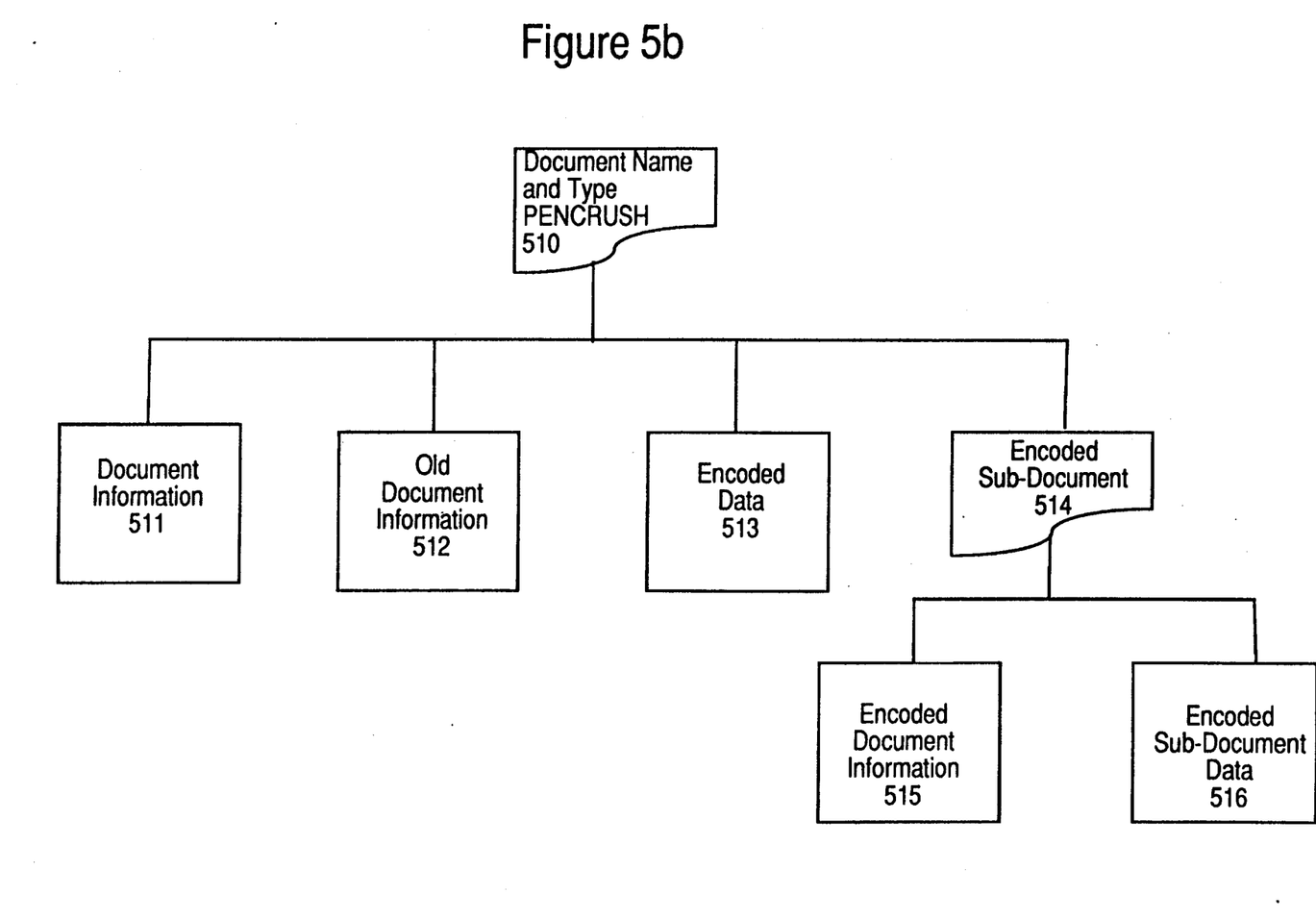
FIG. 5b is an illustration of a document structure of FIG. 5a after being compressed by the method of the currently preferred embodiment of the present invention.

FIG. 5b illustrates the document of FIG. 5a after it has been encoded. First, the document type 510 has been changed. Here the type has been changed to PENCRUSH. Here PENCRUSH is the type which associates the data object with the encoding application. Further, a new document information file 511 has been included. The original document information file has been changed to the name OLD document information 512. The data has been encoded to create encoded data 513. The sub-document 514 has similarly been encoded along with the encoded sub-document information 515 and encoded sub-document data 516. As described above, each of the sub-objects is encoded separately and marked as encoded or decoded.

Figure 6:
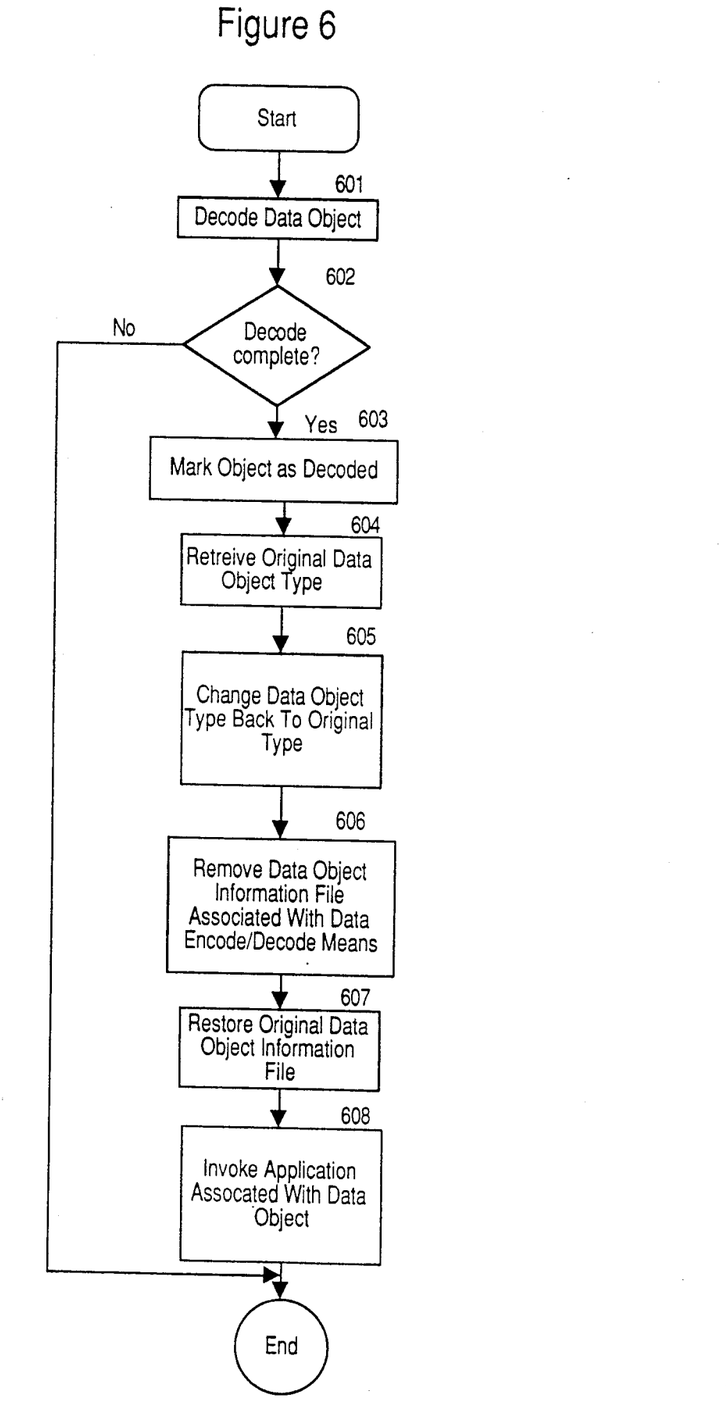
FIG. 6 is a flow chart illustrating the steps taken in re-structuring the data object after decoding as performed in the currently preferred embodiment of the present invention.

An encoded data object must be restored to it's original state after it has been decoded. FIG. 6 is a flow chart illustrating the steps taken in restructuring a data object after decoding. Note that it is assumed that the data object has been encoded in the matter described in FIG. 4. In any event, the data object is decoded, step 601. The step 601 as performed in the currently preferred embodiment will be described in greater detail with respect to FIG. 8. A check is made to determine of the decoding was completed, step 602. As will be discussed in more detail below, complete decoding may be prevented because of insufficient memory availability. So if complete decoding is not achieved, the decoding must be re-invoked at a later time, e.g. when memory becomes available. If decoding is complete, the object is marked as decoded, step 603. The data object type is then changed back to the original type, step 605. The data object information file associated with the data encode/decode means is removed from the data object, step 606. The name of the original data object file is restored, step 607.

At this point the data object may be invoked according to the original application associated with data object, step 608. In the currently preferred embodiment the application identified by the data object "type" will be invoked immediately after the data object has been decoded. This provides for the transparency of operation that is desirable for real-time encoding.

Decoding/Encoding by Sub-objects

A traditional way of encoding a document is to encode the whole document as a single data object. In the hierarchical data object architecture of the currently preferred embodiment, this would require serializing the data to be contiguous in storage and then encoding the data object (e.g. compressed). The currently preferred embodiment has taken a different approach; encoding and decoding at the sub-object level.

This method of encoding individual sub-objects of the data object has several advantages. First, if there is insufficient room to encode the entire data object but there is room to encode a sub-object, the sub-object will be encoded. Also, unlike prior systems if the entire data object cannot be encoded the sub-objects which have already encoded need not be re-encoded. Note that in prior systems the entire object had to be re-encoded. Further, partially encoded documents are supported. For example, if a data object has not been completely encoded, it is still treated as an encoded document. This has the advantage not requiring the entire document to go through the encoding/decoding process a second time.

It should also be noted that the encoding of a data object will temporarily require the original unencoded sub-objects as well as creation of a new sub-objects for the encoded data object. After encoding, any unneeded unencoded sub-objects are deleted.

Figure 7:
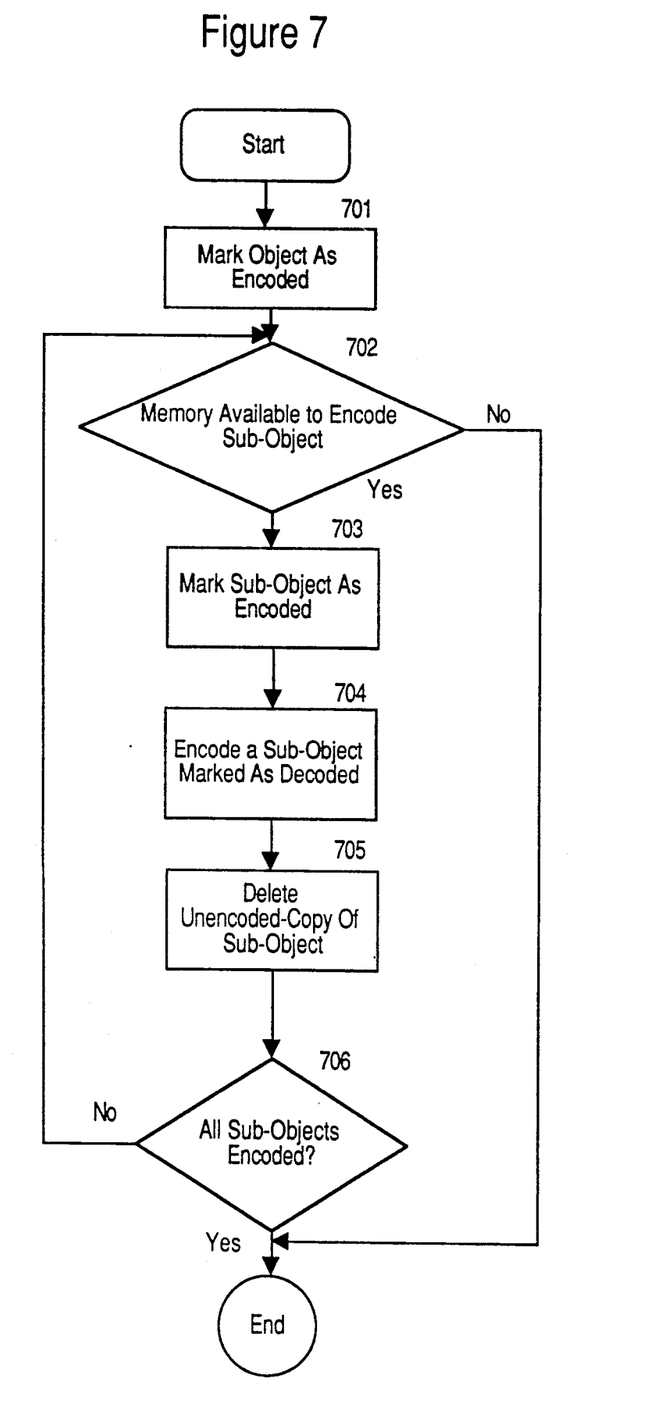
FIG. 7 is a flow chart illustrating the steps taken to encode an object as a collection of sub-objects as performed in the currently preferred embodiment of the present invention.

FIG. 7 is a flow chart illustrating the steps taken to encode a data object as a collection of sub-objects. First, the data object is marked as encoded, step 701. The order of encoding sub-objects within a data object is performed according to the hierarchical structure of the data object. For the sub-objects on the same hierarchical level, the encoding occurs in alphabetical order according to the name of the sub-object. A check is then made to determine if there is available memory for sub-object encoding, step 702. If memory is not available, the processing is complete and encoding ends. If memory is available, the sub-object is marked as encoded, step 703. The sub-object is then encoded, step 704, and the unencoded copy of the sub-object is deleted, step 705. Note that this deletion of the unencoded copy frees up temporary storage that be used for encoding subsequent sub-objects. A check is then made to determine whether all the sub-objects have been encoded, step 706. If all the sub-object have not been encoded a check is then made to see if memory is available for encoding another sub-object per step 702. If all the sub-objects have been encoded then the encoding is completed.

Figure 8:
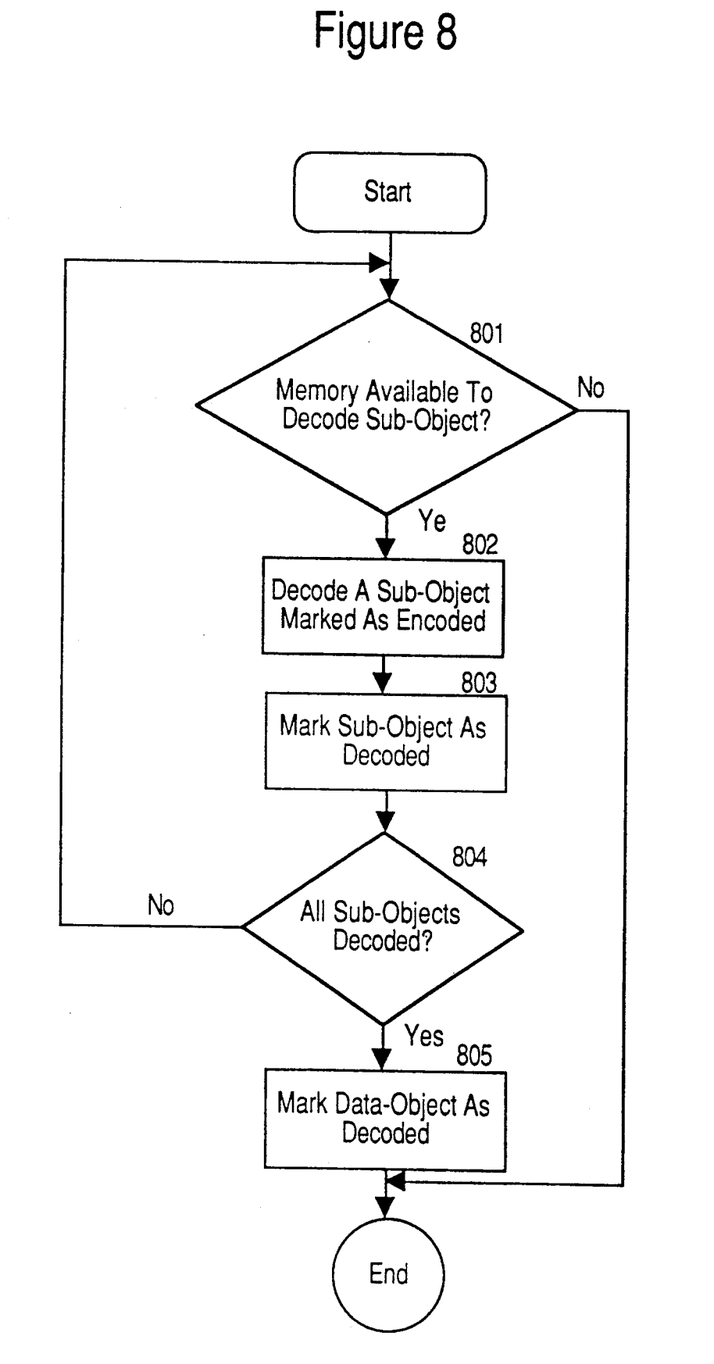
FIG. 8 is a flow chart illustrating the steps taken to decode an object as a collection of sub-objects as performed in the currently preferred embodiment of the present invention.

FIG. 8 is a flowchart illustrating the steps for decoding a sub-object in the currently preferred embodiment of the present invention. Note that these steps can be undertaken irrespective of whether sub-objects have already been decoded. First a check is made to determine if there is available memory for decoding, step 801. A user may be provide a message that the data object has not been decoded. If there is not available memory, the sub-object cannot be decoded. If there is available memory, then the sub-object is decoded, step 802 and marked as decoded, step 803. As before, this occurs within the hierarchical ordering of the data object. A check is then made to determine whether all the sub-objects have been decoded, step 804. If all the sub-objects have not been decoded another sub-object is decoded per step 801. If all the sub-objects have been decoded, the data object is marked as decoded, step 805. Again this method of decoding has the inherent advantages described with respect to encoding via sub-objects.

Temporary Storage Savings

Figure 9:
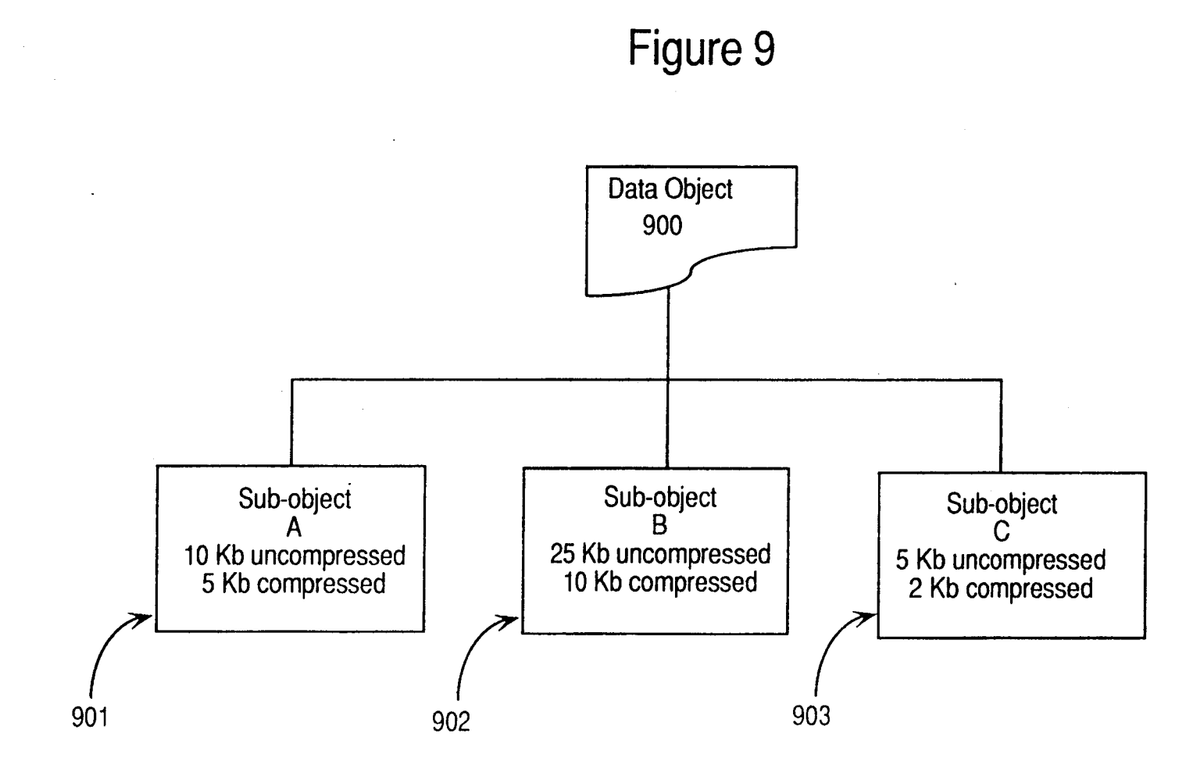
FIG. 9 illustrates the real-time temporary data storage savings when utilizing the methods of the currently preferred embodiment of the present invention.

FIG. 9 is an example which illustrates the storage savings by compressing data objects as sub-objects. Referring to FIG. 9 a data object 900 contains sub-objects A 901, B 902 and C 903. Note that the sub-object A 901 in a non-compressed form is 10 kilobytes in size and in a compressed form is 5 kilobytes in size. The sub-object B is 25 kilobytes in a non-compressed form and 10 kilobytes in a compressed form. Finally, sub-object C is 5 kilobytes in a non-compressed form and 2 kilobytes in a compressed form. One (1) kilobyte is equal to 1024 bytes.

If a compression means first merged each of the various sub-objects and then performed the compression, the storage requirements for performing this would be equal to the storage required before compression (10 Kilobytes+25 Kilobytes+5 Kilobytes) plus the storage required for compressing all the sub-objects (5 Kilobytes+10 Kilobytes+2 Kilobytes). Here that total would be 57 Kilobytes. Note that in this instance all three sub-objects must be compressed or else no compression will occur. Namely, if there is not 57 Kilobytes of available storage during the time that the compression is being executed, the compression will fail. If a failure occurs the entire data object would then have to be re-compressed.

In the present invention each of the sub-objects is individually compressed. Further, as a sub-object is compressed, the uncompressed version is deleted. This has the effect of reducing the storage requirement. Here, maximum the storage needed is equal to the storage compression and the storage required for compressing the largest sub-object. This assumes that the largest sub-object is the first one compressed (which is not always the case). Here, the temporary storage required is only 50 Kilobytes (40 Kb for the uncompressed sub-objects and 10 Kb for sub-object B 402). Note that if sub-object A 901 was first compressed the storage would only be 45 Kb, because the uncompressed copy of sub-object A gets deleted and the compressed sub-object A only requires 5 Kb. While the amount of storage required depends on the sequence in which the sub-objects are encoded, 50 Kilobytes is the most that would be needed.

It is more likely that there would be 50 Kilobytes of storage available then 57 Kilobytes. Moreover, either of the sub-objects A or C may be compressed if there is only 45 Kilobytes or 42 Kilobytes, respectively of temporary storage available.

Additionally, if failure occurs on the compression of a subsequent sub-object, all prior compressed sub-objects do not have to be re-compressed. This has the advantage of reducing the number of times the recompression would occur. This also has the potential of reducing the amount of time required for compressing a data object.

Thus, a method and apparatus for causing a data object to be encoded/decoded, is described.

I claim:

1. In a computer system having a compression/decompression means for compressing and decompressing data objects, a method for managing the operation of said compression/decompression means to transparently cause data objects to be, compressed said method comprising the steps of:

a) compressing a first data object and a second data object;

b) when a user causes said first data object to be opened:

c) determining whether said second data object is stored uncompressed;

d) if said second data object is stored uncompressed:

e) re-compressing said second data object;

f) storing said second data object as compressed;

g) removing an indication that said second data object is stored uncompressed;

h) decompressing said first data object;

i) when said user causes said first data object to be closed:

j) storing said first data object uncompressed;

k) indicating that said first data object is stored uncompressed;

l) when said user causes said second data object to be opened:

m) determining whether said first data object is stored uncompressed;
n) if said first data object is stored uncompressed:
o) recompressing said first data object;
p) storing said first data object as compressed;
q) removing an indication that said first data object is stored uncompressed;
r) decompressing said second data object;
s) when said user causes said second data object to be closed:
t) storing said second data object uncompressed;
u) indicating that said second data object is stored uncompressed;
v) repeating steps b–k each time said first data object is opened and closed;
w) repeating steps l–u each time said second data object is opened and closed.

2. The method as recited in claim 1 wherein said data objects are comprised of a plurality of sub-objects, said re-compressing steps are further comprised of the steps of:
a) marking said data object as compressed;
b) encoding a sub-object marked as decompressed;
c) marking said sub-object as
d) repeating steps b)–c) for all sub-objects of said decoded data object which are marked as decompressed.

3. The method as recited in claim 2 wherein said step of decompressing said first encoded data object is further comprised of the steps of:
a) decoding a sub-object marked as encoded;
b) marking said sub-object as decoded;
c) repeating steps a)–b) for all sub-objects marked as decoded; and
d) marking said data object as decoded.

4. The method as recited in claim 3 is further comprised of the step of invoking an application associated with said first data object.

5. The method of claim 1 further comprising the steps of:
determining if memory is available for decompressing a sub-object of said first data object;
if memory is available, decompressing said sub-object and marking said sub-object as decompressed;
if memory is not available, terminating the decompression of said first data object.

6. The method of claim 1 further comprising the steps of:
determining if said first data object is in use;
if said first data object is not in use, identifying said first data object as requiring compression;
if said first object is in use, identifying a third data object that is not in use and compressing said third data object.

7. The method of claim 1 further comprising the step of invoking an application program associated with said second data object.

8. A computer system having a processor, execution memory, program storage memory, and data storage for storing data objects, said computer system having means for transparently encoding and decoding data objects further comprising:
a) data object encoding means for encoding a first decoded data object and a second decoded data object;
b) data object decoding means for decoding a first encoded data object and a second encoded data object;
c) storage means for storing a list of decoded data objects that have been decoded by said data object decoding means;
d) means for detecting that a user has requested that said first encoded data object be opened;
e) means for invoking said data object decoding means responsive to, detecting that said user has requested that said first encoded data object be opened, said means for invoking said data object decoding means for starting the decoding of said first encoded data object;
f) means for invoking said data object encoding means responsive to detecting that said user has requested that said first encoded data object be opened, said means for invoking said data object means for starting the encoding of said second decoded data object;
g) means for storing said first decoded data object;
h) means for storing said second encoded data object.

9. The computer system as recited in claim 8 wherein said computer system is further comprised of:
a) means for adding a decoded data object to said list of decoded data objects;
b) means for removing a decoded data object from said list of decoded data objects; and
c) means for identifying that a decoded data object is no longer in use.

10. The computer system of claim 8 further comprising means for determining whether there is enough memory available in said computer system for decoding a sub-object of said first encoded data, wherein said sub-object is decoded and marked as decoded if said memory is available and wherein said sub-object is not decoded if said memory is not available.

11. The computer system of claim 8 further comprising means for invoking an application program associated with said first encoded data.

* * * * *